United States Patent [19]

Ando et al.

[11] Patent Number: 4,831,472
[45] Date of Patent: May 16, 1989

[54] CASSETTE LOADING APPARATUS

[75] Inventors: Takashi Ando, Neyagawa; Yoshihiro Makino, Suita; Yoshinobu Kishimoto, Takarazuka; Tetsuki Asaoka, Takatsuki, all of Japan

[73] Assignee: Matsushita Electric Industrial Co., Ltd., Osaka, Japan

[21] Appl. No.: 86,945

[22] Filed: Aug. 18, 1987

[30] Foreign Application Priority Data

| Aug. 19, 1986 | [JP] | Japan | 61-193351 |
| Aug. 19, 1986 | [JP] | Japan | 61-193352 |
| Aug. 19, 1986 | [JP] | Japan | 61-193353 |

[51] Int. Cl.$^4$ ............... G11B 15/00; G11B 17/00
[52] U.S. Cl. .................. 360/96.5; 360/99.06
[58] Field of Search ............ 360/96.5, 97, 99, 137

[56] References Cited

U.S. PATENT DOCUMENTS

| 4,291,353 | 9/1981 | Fletcher et al. | 360/137 |
| 4,628,382 | 12/1986 | Okumura | 360/96.5 |
| 4,636,892 | 1/1987 | Friehauf et al. | 360/97 |
| 4,642,717 | 2/1987 | Matsuda et al. | 360/97 |
| 4,656,541 | 4/1987 | Rhyner et al. | 360/96.5 |
| 4,656,542 | 4/1987 | Shibata | 360/97 |
| 4,685,010 | 8/1987 | Tronzano | 360/97 |
| 4,688,123 | 8/1987 | Sokol et al. | 360/97 |

FOREIGN PATENT DOCUMENTS

| 58-108058 | 6/1983 | Japan | 360/96.5 |
| 59-154667 | 9/1984 | Japan | 360/96.5 |

Primary Examiner—John H. Wolff
Assistant Examiner—Matthew J. Bussan
Attorney, Agent, or Firm—Wenderoth, Lind & Ponack

[57] ABSTRACT

A cassette loading apparatus including a cassette guide provided adjacent to an insertion opening of a tape cassette, a cassette holder, a pair of said plates for guiding the cassette holder during displacement thereof and a chassis having the cassette guide secured thereto, is characterized in that the side plates are mounted on the cassette guide from above with at least one portion of each of the side plates secured to the cassette guide and at least another portion of each of the side plates secured to the chassis.

4 Claims, 5 Drawing Sheets

CASSETTE LOADING APPARATUS

BACKGROUND OF THE INVENTION

The present invention relates to a cassette loading apparatus for use in magnetic recording/reproducing apparatuses such as a video tape recorder.

Various types of cassette loading apparatuses for use in magentic recording/reproducing apparatuses such as a video tape recorder are known and usually employ a so-called front loading system in which a tape cassette is inserted through a front opening. Although such a front loading type cassette loading apparatus functions satisfactorily, it requires a number of assembling steps due to its relatively complex structure. For this reason, the cassette loading apparatuses have hitherto been assembled separately from bodies of the magnetic recording-/reproducing apparatuses.

More specifically, as shown in FIGS. 1 and 2, a prior art cassette loading apparatus includes a cassette holder 1 for releasably holding a type cassette (not shown) such as a video tape cassette and side plates or side frames 2 and 3 provided at opposite right and left sides of the cassette holder 1. L-shaped guide slots 8 and 10 are formed in the right side plate 2, while L-shaped guide slots 9 and 11 are formed in the left side plate 3. Projecting pins 4 and 6 are mounted on the right side of the cassette holder 1 so as to be held in engagement with the right side plate within the guide slots 8 and 10 of the right side plate 2, respectively. Likewise, projecting pins 5 and 7 are mounted on the left side of the cassette holder 1 so as to be held in engagement with the left side plate within the guide slots 9 and 11, respectively. Drive arms 12 and 13 for moving the cassette holder 1 between a first position and a second position (loadig position) are provided at the side plates 2 and 3, respectively. Assuming that the known cassette loading apparatus is disposed horizontally, the cassette holder 1 is moved horizontally and vertically as the projecting pins 4, 5, 6 and 7 move along the guide slots 8, 9, 10 and 11, respectively. Reference numerals 4a and 5a show the projecting pins 4 and 5 disposed at the second or loading position. The drive arm 12 has a toothed portion 12a. Although not specifically shown, the drive arm 13 also has a toothed portion similar to the toothed portion 12a of the drive arm 12. A drive motor 16 transmits a driving force, via a worm 17, a worm wheel 18 and a gear 19, to the toothed portion 12a. The gear 19 is fixed to one end of a shft 20 which is rotatably supported by the side plates 2 and 3. Another gear 21 is fixed to the other end of the shaft 20 in engagement with the toothed portion of the drive arm 13.

A cassette guide 22 is provided for guiding the tape cassette when the tape cassette is inserted into the cassette holder 1 and for coupling the side plates 2 and 3 with each other. A top plate 23 is provided for coupling the side plates 2 and 3 with each other at an upper portion of the known cassette loading apparatus and for imparting rigidity to the entire known cassette loading apparatus.

The prior art cassette loading apparatus shown in FIG. 1 is assembled as follows. Initially, the cassette holder 1 and the side plates 2 and 3 are positioned such that the projecting pins 4 to 7 are received in or engaged with the guide slots 8 to 10 of the side plates 2 and 3, respectively. Generally, to this end, the cassette holder 1 is secured to a jig (not shown) and then, the side plates 2 and 3, which are placed accurately at opposite sides of the cassette holder 1, are slowly shifted towards the cassette holder 1 such that the projecting pins 4 to 7 are received in the guidie slots 8 to 10, respectively. The drive motor 16, the worm 17 and the worm wheel 18 are attached to the right side plate 2 in advance as a drive unit, a description of the assembling steps of the drive unit is omitted.

Subsequently, opposite ends of the cassette guide 22 are secured to the side plates 2 and 3, respectively. Then, the drive arms 12 and 13 are rotatably attached to a shaft 14 extending between and projecting outwardly from the side plates 2 and 3 such that the projecting pins 4 and 5 of the cassette holder 1 are, respectively, received in guide slots 15a and 15b formed in the drive arms 12 and 13, respectively. Thereafter, the left gear 21 is press fitted to one end of the shaft 20 and then, the shaft 20 having the gear 21 mounted thereon is fitted through the side plates 3 and 2. Then, the right gear 19 is attached to the other end of the shaft 20 and is fixed by an E-shaped ring 32. The gears 19 and 21 are positioned by adjustig the engagement of the teeth so that the drive arms 12 and 13 move synchronously with each other. The top plate 23 is attached to the side plates 2 and 3 by screws 24a, 24b, 24c and 24d such that the high strength and highly accurate assembling of the known cassette loading apparatus are ensured. Thus, the assembling of the known cassette loading apparatus is completed.

However, in the known cassette loading apparatus having the above described construction, the side plates 2 and 3 are required to be slowly shifted towards the cassette holder 1 such that the projecting pins 4 to 7 are, respectively, received in the guide slots 8 to 11 of the side plates 2 and 3. To this end, a relatively large and and complex jig for assembly is needed. Furthermore, the known cassette loading apparatus is disadvantageous in that a relatively long time period is required for the assembly thereof.

Moreover, the known cassette loading apparatus has a drawback in that after the shaft 20 having the gear 21 secured thereto has been fitted through the side plates 3 and 2, the gear 19 is required to be mounted on the shaft 20 so as to coincide, i.e. be in phase, with the gear 21, thereby resulting in a time delay in its assembling.

SUMMARY OF THE INVENTION

The present invention has been developed in order to eliminate the above described drawbacks inherent in the conventional cassette loading apparatuses.

It is, therefore, an object of the present invention to provide a novel and useful cassette loading apparatus which can be assembled easily with fewer assembling steps.

In order to accomplish this object of the present invention, a cassette loading apparatus embodying the present invention comprises: a cassette guide which is provided in the vicinity of an insertion opening of a tape cassette; a cassette holder for holding the tape cassette; a pair of side plates for guiding said cassette holder during the displacement thereof, and which are provided at opposite sides of said cassette holder, respectively; and a chassis to which said cassette guide is secured; said side plates being mounted on said cassette guide from above such that at least one portion of each of said side plates is secured to said cassette guide, with at least another portion of each of said side plates being secured to said chassis.

The cassette loading apparatus according to the present invention is characterized in that a cassette holder can be inserted from above during the assembly thereof.

BRIEF DESCRIPTION OF THE DRAWINGS

This object and features of the present 6 invention will become more readily apparent from the following detailed description of the preferred embodiment taken in conjunction with the accompanying drawings in which.

Before the description of the present invention proceeds, it is to be noted that like parts are designated by like reference numerals throughout the several views of the accompanying drawings.

DETAILED DESCRIPTION OF THE PREFERRED EMBODIMENT

Figure 1:
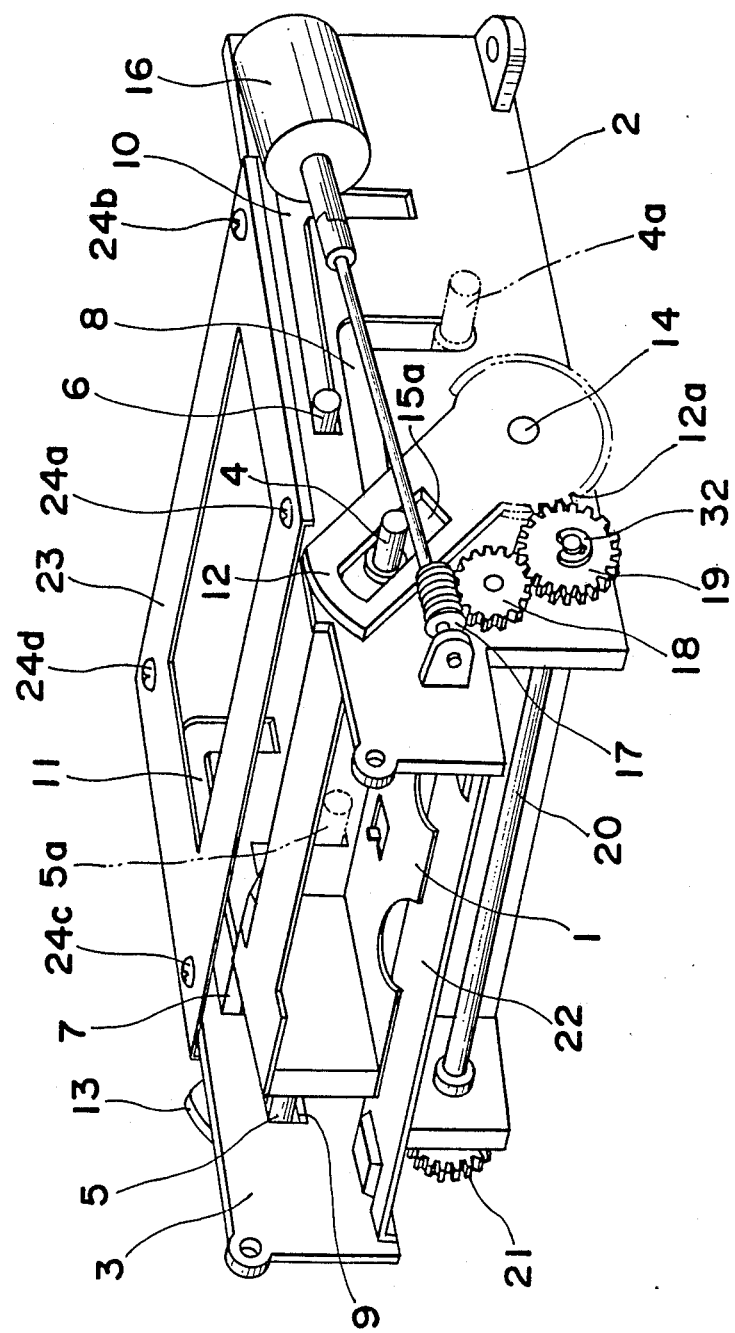
FIG. 1 is a perspective view of a prior art cassette loading apparatus (already referred to)
Figure 2:
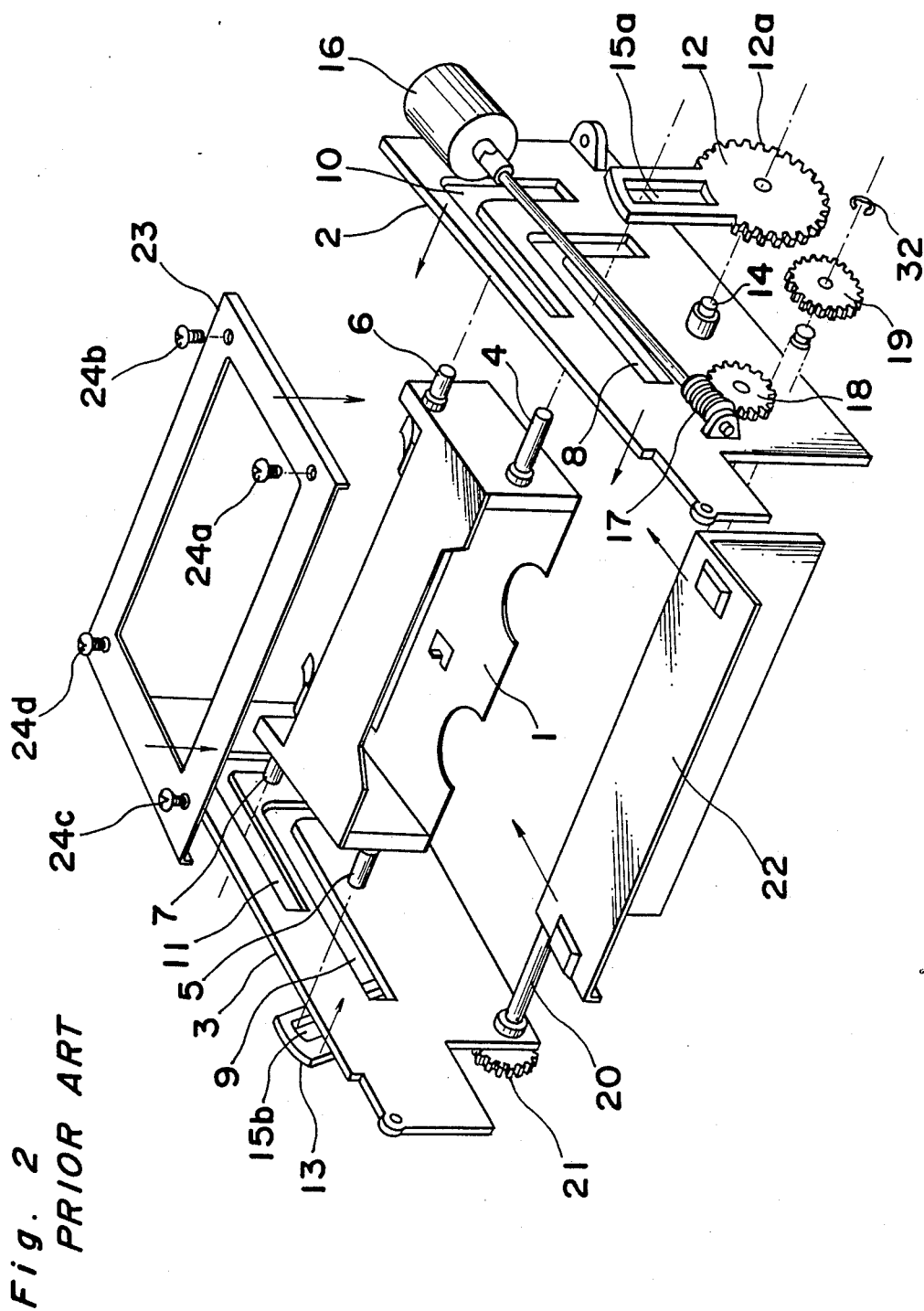
FIG. 2 is an exploded perspective view of the prior art cassette loading apparatus of FIG. 1 (already referred to)
Figure 3:
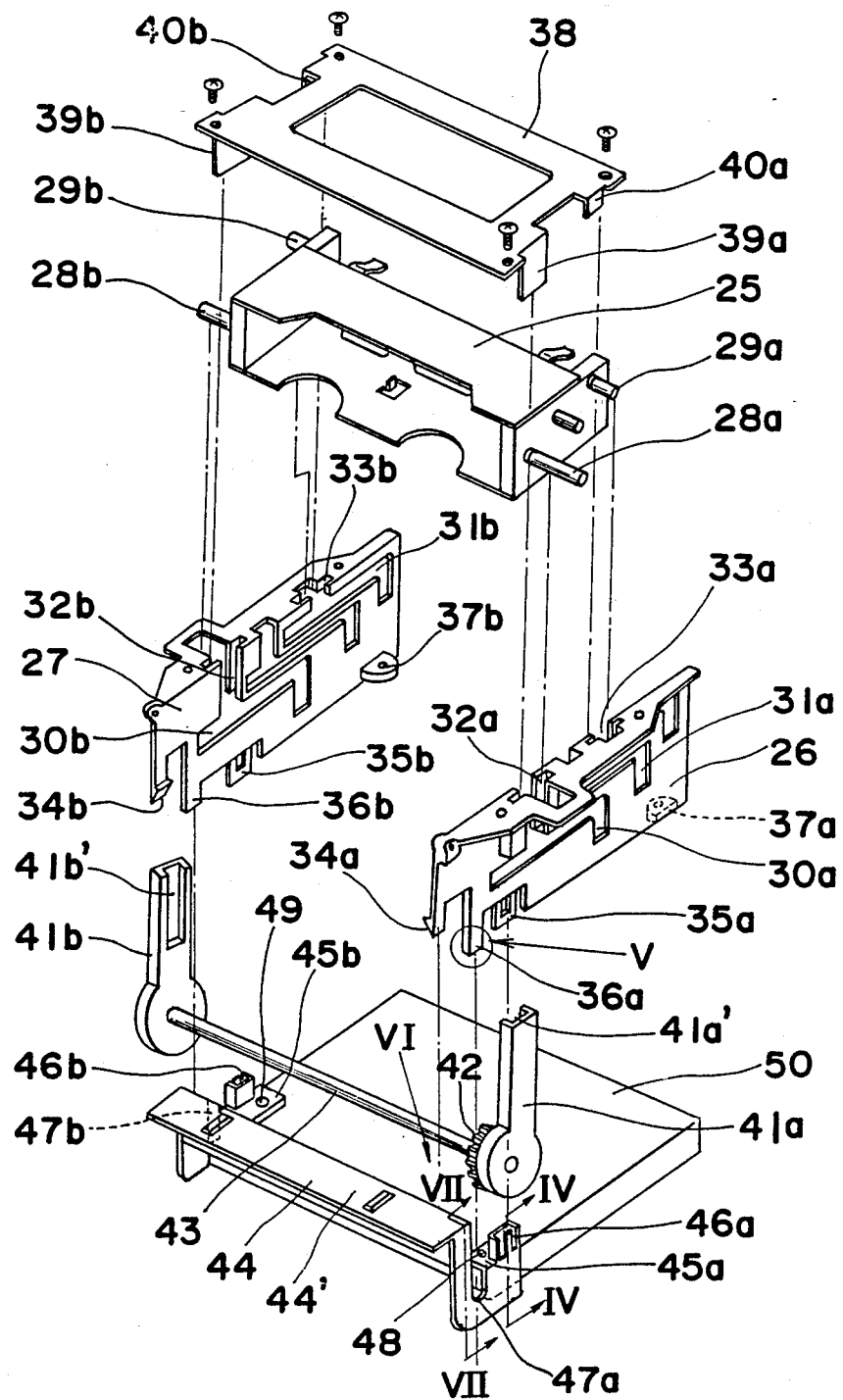
FIG. 3 is an exploded perspective view of a cassette loading apparatus according to one preferred embodiment of the present invention.

Referring now to the drawings, there is shown in FIG. 3, a cassette loading apparatus according to one preferred embodiment of the present invention. The cassette loading apparatus includes a cassette holder 25 for releasably holding a tape cassette (not shown) such as a video tape cassette and side plates 26 and 27 provided at opposite right and left sides of the cassette holder 25. The side plate 26 is formed with L-shaped guide slots 30a and 31a for receiving, respectively, pins 28a and 29a projecting from a right side face of the cassette holder 25, while the side plate 27 is formed with L-shaped guide slots 30b and 31b for receiving, respectively, pins 28b and 29b projecting from a left side face of the cassette holder 25. The side plate 26 is formed, at its upper portion, with recesses 32a and 33a extending from the guide slots 30a and 31a, respectively. Likewise, the side plate 27 is formed, at its upper portion, with recesses 32b and 33b extending from the guide slots 30b and 31b, respectively.

Meanwhile, the guide plate 26 is formed with a claw 34a, a projection 36a and a clamping piece 35a, which re brought into engagement with a cassette guide 44 to be described later, and a lug 37a for supporting a machine screw such that the guide plate 26 is fixable, at the lug 37a, to a chassis 50 of a magnetic recording/reproducing apparatus by a machine screw. Similarly, the guide plate 27 is formed with a claw 34b, a projecting 36b and a clamping piece 35b, which are brought into engagement with the cassette guide 44, and a lug 37b for supporting a machine screw such that the guide plate 27 is fixable, at the lug 37b, to the chassis 50. The cassette loading apparatus further includes a top plate 38 and drive arms 41a and 41b for driving the cassette holder 25. The top plate 38 is formed with protrusions 39a, 40a, 39b and 40b which are, respectively, brought into engagement with the recesses 32a and 33a of the side plate 26 and the recesses 32b and 33b of the guide plate 27. The drive arm 41a is formed with a groove 41a' for receiving the pin 28a at a distal end of the drive arm 41a, while the drive arm 41b is formed with a groove 41b' for receiving the pin 28b at a distal end of the drive arm 41b. The drive arms 41a and 41b are, respectively, secured to opposite ends of a bar 43. The drive arm 41a has a gear portion 42 to which a driving force is applied from a driving member (not shown).

Furthermore, the cassette guide 44 is formed, at its opposite end portons, with leg portions 45a and 45b. Bearing portions 47a and 47b each constituted by a U-shaped slit are, respectively, formed on the leg portions 45a and 45b so as to confront the tape cassette (not shown). Openings 46a and 46b are, respectively, formed on the leg portions 45a and 45b so as to receive the clamping piece 35a of the side plate 26 and the clamping piece 35b of the side plate 27. The cassette guide 44 is mounted on the chassis 50 by machine screws 48 and 49. Although not specifically shown, a rotary head cylinder and a reel driving mechanism are mounted on the chassis 50.

Figure 4:
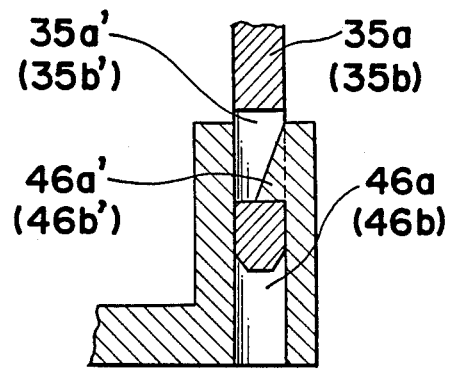
FIG. 4 is a sectional view taken along the line IV—IV in FIG. 3.
Figure 5:
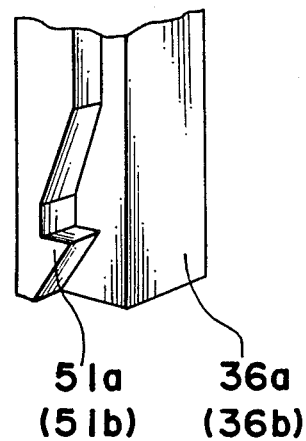
FIG. 5 is detail view of the portion V in FIG. 3.
Figure 6:
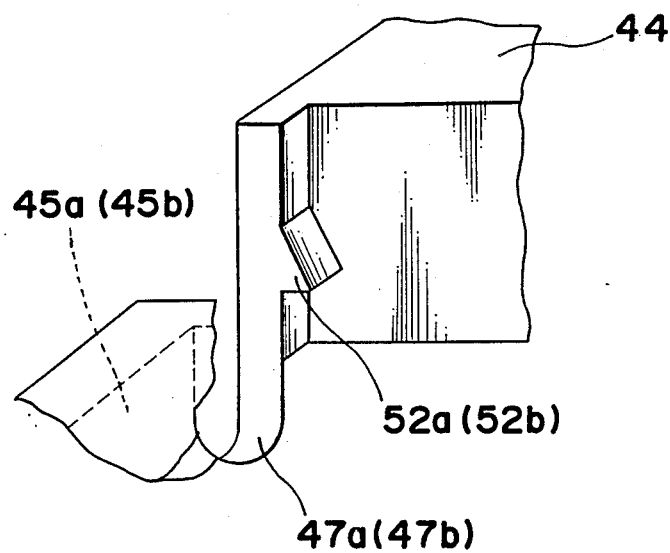
FIG. 6 is a fragmentary perspective view taken in the direction of the arrow VI in FIG. 3.
Figure 7:
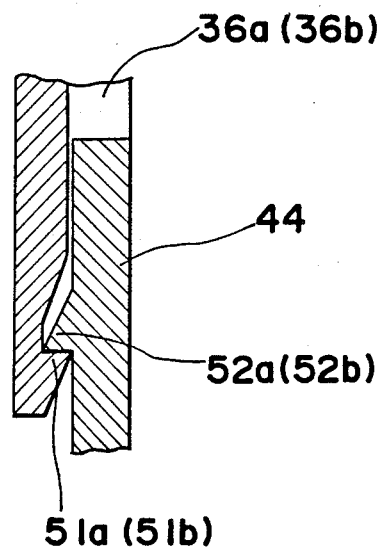
FIG. 7 is a sectional view taken along the line VII—VII in FIG. 3.
Figure 8:
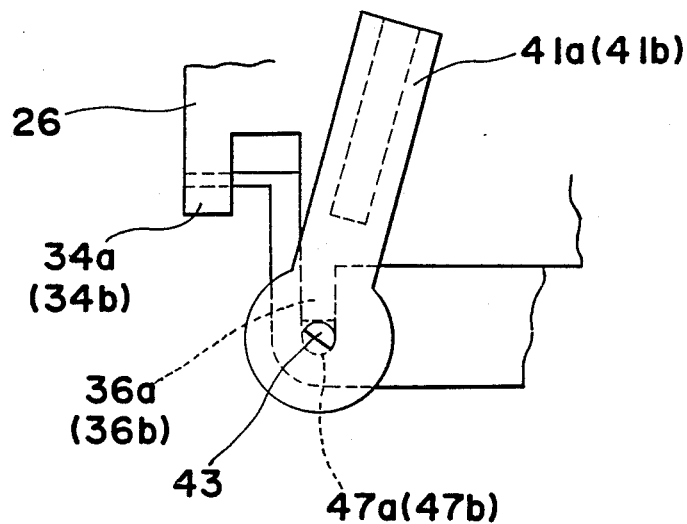
FIG. 8 is a fragmentary right side elevational view of the assembled cassette loading apparatus of FIG. 3.

FIG. 4 is a sectional view taken along the line IV—IV in FIG. 3 showing the clamping piece 35a of the side plate 26 fitted into the opening 46a of the cassette guide 44. The clamping piece 35a is locked to the cassette guide 44 through the engagement of a wedge portion 46a' defining the opening 46a with a lower edge defining an aperture 35a' formed in the clamping piece 35a. FIG. 5 is a detail view of the portion V in FIG. 3, particularly showing that the projections 36a and 36b are formed with pawls 51a and 51b, respectively, FIG. 6 is a fragmentary perspective view taken in the direction of the arrow VI in FIG. 3, particularly showing that clicks 52a and 52b are formed, in the vicinity of the bearing portions 47a and 47b, on the cassette guide 44. FIG. 7 is a sectional view taken along the line VII—VII in FIG. 3 showing the projection 36a of the side plate 26 inserted into the bearing portion 47a of the cassette guide 44. In this state, the pawl 51a of the projection 36a of the side plate 26 is engages the click 52a of the cassette guide 44. FIG. 8 is a fragmentary right side elevational view of the cassette loading apparatus showing the projection 36a of the side plate 26 inserted into the bearing portion 47a of the cassette guide 44. Although only the right side of the cassette loading apparatus has been described, the left side of the cassette loading apparatus is similar to the right side. Therefore, the description thereof is omitted for brevity.

Hereinbelow, the assembling steps of the cassette loading apparatus having the above-described construction are described with reference to FIG. 3. Initially, the cassette guide 44 is secured to the chassis 50 by the machine screws 48 and 49. Then, the bar 43 having the drive arms 41a and 41b fixed to its opposite ends is inserted into the bearing portions 47a and 47b of the cassette guide 44 from above. Thereafter, the side plates 26 and 27 are inserted into the cassette guide 44 so as to be locked to the cassette guide 44 through the engagement of the side plates 26 and 27 with the cassette guide 44. Namely, at this time, the claws 34a and 34b of the side plates 26 and 27 are brought into locking engagement with an upper plate portion 44' of the cassette guide 44 and the projections 36a and 36b of the side plates 26 and 27 are, respectively, inserted into the bearing portions 47a and 47b of the cassette guide 44 such that the claws 51a and 51b of the projections 36a and 36b are, respectively, brought into locking engagement with the clicks 52a and 52b of the cassette guide 44 as shown in FIG. 7 while the clamping pieces 35a and 35b of the side plates 26 and 27 are, respectivey, inserted into the openings 46a and 46b of the cassette guide 44 such that the wedge portions 46a' and 46b' in the openings 46a and 46b are, respectively, brought into locking engagement with the lower edges defining the apertures 35a' and 35b' of the clamping pieces 35a and 35b as shown in FIG. 4. In this state, the bar 43 is rotatably retained by the projections 36a and 36b and the bearing portions 47a and 47b as shown in FIG. 8.

Subsequently, the drive arms 41a and 41b are rotated until the grooves 41a' and 45b' formed at the distal end portion of each of the drive arms 41a and 41b confront the recesses 32a and 32b of the side plates 26 and 27, respectively. In this state, the pins 28a and 29a and the pins 28b and 29b of the cassette holder 25 are positioned above the recesses 32a and 33a of the side plate 26 and the recesses 32b and 33b of the side plate 27, respectively so as to be insertable therethrough from above until the pins 28a and 29a and the pins 28b and 29b are, respectively, brought into contact with lower horizontal edges defining the guide slots 30a and 31a of the side plate 26 and of the guide slots 30b and 31b of the side plate 27. Then, the top plate 38 is mounted on the side plates 26 and 27 by press fitting the protrusions 39a, 40a, 39b and 40b of the top plate 38 through the recesses 32a and 33a of the side plate 26 and the recesses 32b and 33b of the side plate 27, respectively until lower edges of the protrusions 39a, 40a, 39b and 40b reach upper edges defining the guide slots 30a, 31a, 30b and 31b, respectively. Thus, the recesses 32a, 33a, 32b and 33b are occupied by the protrusions 39a, 40a, 39b and 40b, respectively such that each of the L-shaped guide slots 30a, 31a, 30b and 31b communicating with the recesses 32a, 33a, 32b and 33b are closed.

As will be understood from the disclosure so far, the pins 28a, 29a, 28b and 29b are used for limiting horizontal and vertical movements of the cassette holder 25 and therefore, the number of these pins can be changed if desired.

As is clear from the foregoing description, in accordance with the present invention, the cassette holder can be easily inserted from above when assembling the cassette holder with the side plates and thus, the cassette loading apparatus can be assembled easily, thereby resulting in a reduction in its manufacturing cost.

Furthermore, in accordance with the present invention, such a simple assembling of the cassette loading apparatus enables the cassette loading apparatus to be assembled within the magnetic recording/reproducing apparatus.

Although the present invention has been fully described by way of example with reference to the accompanying drawings, it is to be noted here that various changes and modifications will be apparent to those skilled in the art. Therefore, unless such changes and modifications depart from the scope of the present invention, they should be construed as being included therein.

What is claimed is:

1. A cassette loading apparatus comprising:
a chassis;
a cassette guide secured to said chassis for guiding a cassette into the apparatus;
a pair of spaced apart side plates each of which has at least one portion engaging said cassette guide, at least another portion secured to said chassis, and guide means;
said cassette guide having opposite end portions, and engaging means disposed at each of said end portions capable of receiving said at least one portions of said side plates while said cassette guide is secured to said chassis and said side plates are moved toward said chassis, said engaging means engaging said side plates once the at least one portions of said side plates are received by said engaging means; and
a cassette holder disposed between said side plates for releasably holding a cassette, said cassette holder guidably supported by side plates by said guide means.

2. A cassette loading apparatus as claimed in claim 1, wherein said engaging means comprises pawl means for securing said side plates to said cassette guide once the at least one portions of said side plates are received by the engaging means.

3. A cassette loading apparatus comprising:
a chassis;
a cassette guide secured to said chassis for guiding a cassette into the apparatus;
said cassette guide having opposite ends, and a pair of leg portions projecting from said opposite ends, respectively,
said leg portions each comprising a bearing portion defining a recess open to an upper portion of said leg portions, respectively,
a bar rotatably supported by said cassette guide in the recesses defined by the bearing portions;
a pair of spaced apart side plates each of which has guide means, and an engagement portion extending in a respective one of said recesses over said bar and engaged with said cassette guide;
a cassette holder disposed between said side plates for releasably holding a cassette, said cassette holder guidably supported on said side plates by said guide means between an insertion position at which a cassette inserted in the apparatus is held by said cassette holder and a loaded position; and
a pair of drive members each of which is mounted to a respective end of said bar so as to be synchronously displaceable therewith, said drive members operatively connected to said cassette holder for driving said cassette holder between said insertion and said loaded positions when synchronously displaced.

4. A cassette loading apparatus as claimed in claim 3, wherein each of said side plates has a first pawl extending adjacent the engagement portion thereof, and said cassette guide has a pair of second pawls each of which extends adjacent a respective one of said bearing portions, said first and said second pawls respectively engaging each other when the engagement portions of said side plates are received in the recesses defined by the bearing portions of said cassette guide to secure said side plates to said cassette guide.

* * * * *